United States Patent [19]

Schüssler et al.

[11] Patent Number: 5,633,644
[45] Date of Patent: May 27, 1997

[54] PROCESS FOR MONITORING SHIP TRAFFIC AT SEA WHILE RECOGNIZING OIL SPILLS AND POTENTIAL SHIP COLLISIONS

[75] Inventors: Harald Schüssler, Daisendorf; Jörg Herrmann, Salem; Manfred Langemann, Stetten, all of Germany

[73] Assignee: Dornier GmbH, Germany

[21] Appl. No.: 671,358

[22] Filed: Jun. 27, 1996

Related U.S. Application Data

[63] Continuation of PCT/DE95/01487 Oct. 26, 1995.

[30] Foreign Application Priority Data

Oct. 27, 1994 [DE] Germany .................. 44 38 325.8

[51] Int. Cl.⁶ ........................................ G01S 3/02
[52] U.S. Cl. ................... 342/455; 342/41; 342/456; 364/461
[58] Field of Search ................ 342/29, 37, 41, 342/455, 456, 357; 364/461

[56] References Cited

U.S. PATENT DOCUMENTS

| | | | |
|---|---|---|---|
| 3,993,991 | 11/1976 | Jackson | 343/112 CA |
| 5,191,341 | 3/1993 | Gonard et al. | 342/456 |
| 5,248,979 | 9/1993 | Orme et al. | |
| 5,532,679 | 7/1996 | Baxter | 340/539 |

OTHER PUBLICATIONS

"Current RDDP Activities in Oceanography," C. Bjerkelund et al., IEEE 0-803-1385-Feb. 1993, 1993, pp. III-1-III6.
"Radarsat," R. Keith Raney et al., IEEE, vol. 79, No. 6, Jun. 1991, pp. 839–849.
"Space-Radar Surveillance: Concepts and Architectures," G. Galati et al., IEICE Trans. Commun., vol. E75-B, No. 8, Aug. 1992, pp. 755–765.
Intrenational Search Report dated Jan. 25, 1996.

*Primary Examiner*—Thomas H. Tarcza
*Assistant Examiner*—Dao L. Phan
*Attorney, Agent, or Firm*—Evenson, McKeown, Edwards & Lenahan P.L.L.C.

[57] ABSTRACT

The invention provides a system and a method for detection of oil spills and icebergs at sea and for aiding the navigation of ship traffic to avoid collisions between ships and icebergs. A constellation of polar orbiting satellites is used to determine the position of icebergs and oil spills within an observation area, and this information is transmitted to a data processing center which also receives information concerning the position of ships within the observation area. The data processing center uses this information to evaluate the likelihood of collisions between ship and icebergs and sends warning signals to the ships, alerting them to the danger. The data processing center also correlates the position of ships and oil spills to determine the likely cause of the latter.

6 Claims, 1 Drawing Sheet

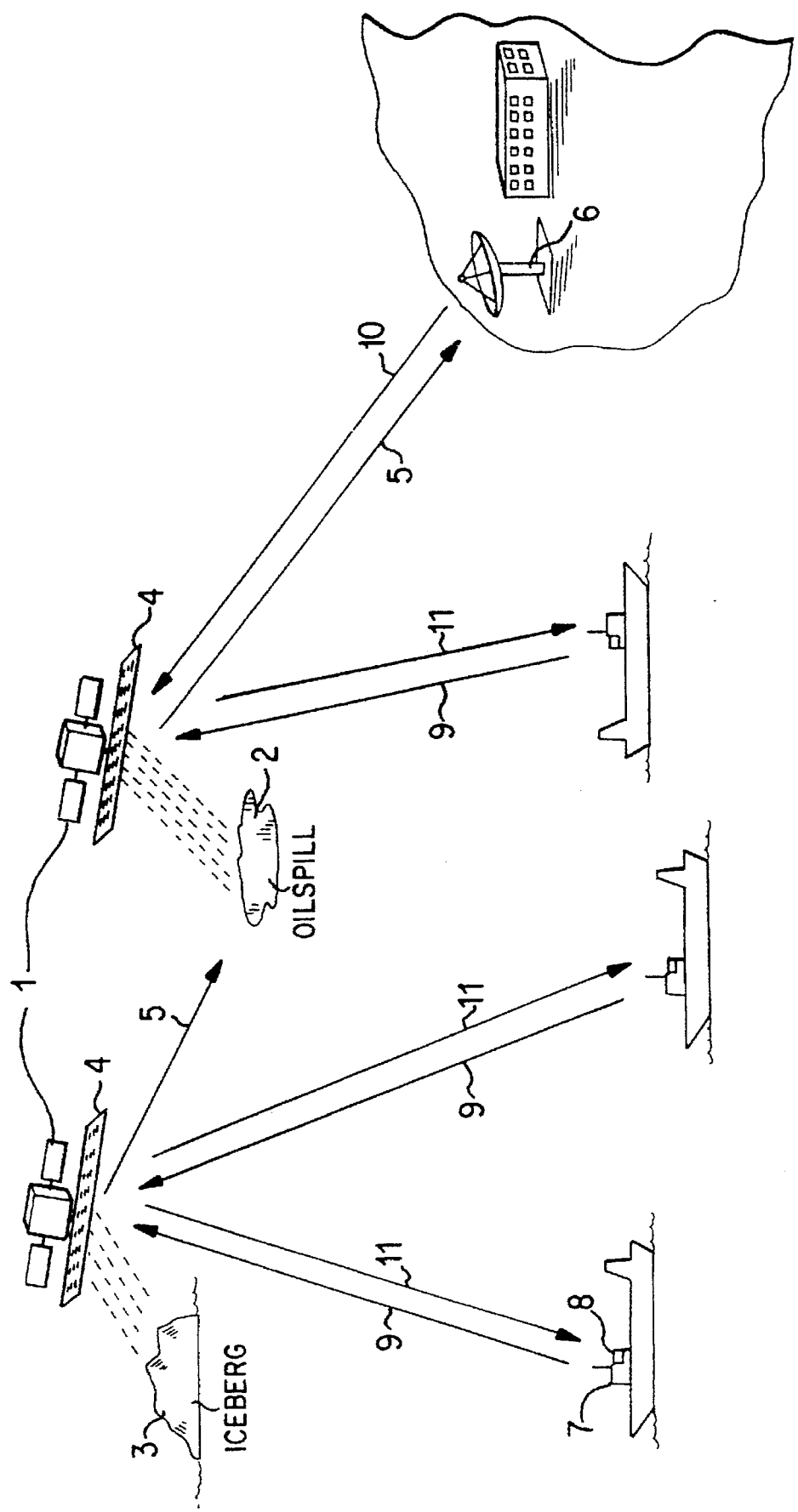

PROCESS FOR MONITORING SHIP TRAFFIC AT SEA WHILE RECOGNIZING OIL SPILLS AND POTENTIAL SHIP COLLISIONS

BACKGROUND AND SUMMARY OF THE INVENTION

This application is a continuation of International Patent Application No. PCT/DE95/01487, filed Oct. 26, 1995. The invention relates to a process for early detection of oil spills in the sea and for aiding navigation with respect to ship traffic, to avoid collisions between ships, and between ships and icebergs.

Observation and detection of oil spills is routinely carried out on several coasts (for example, the North Sea coast in the Netherlands). In the latter case, so-called "Coast Guard" planes are used which, however, because of their limited operating range can observe only a relatively narrow coastal strip of approximately 2 to 3 nautical miles. Moreover, because the detection of oil spills is carried out visually by the pilots, this method can be used only during the day and in favorable weather conditions.

In a pilot program, an oil detection project was carried out at the German North Sea coast by means of airplanes equipped with a Synthetic Aperture Radar Sensor ("SAR"). Although, this radar sensor can also detect oil spills at night, once again because of the limited operating range of the planes, a routine observation of larger sea areas is also not possible.

The ERS-1 and ERS-2 satellites operated by the European Space Agency are equipped with comparable radar sensors. Because of their global coverage, they also permit oil detection in areas outside the coastal strip of a width of 2 to 3 nautical miles. The effective width of the strip covered by these sensors is approximately 100 km. However, the repetition rate of these satellites (that is, the time period between successive observations of a specific point on the earth's surface is approximately 13 days (at night and during the day).

Routine detection of possible oil spills and the identification of the potential causes (that is, an identification of the vessel(s) involved) will be possible only when the repetition rate can be reduced to approximately three hours, so that the local distance between the position of the oil spill and the position of the ship in question can be reduced to less than 50 km. Such a repetition rate, however, would require a satellite constellation of the ERS type with approximately 100 individual satellites. Because of the high procurement costs of the satellites and the associated operating costs on the ground, the resulting financial expenditures for such a system are out of proportion to the economic savings potential (such as the costs for removing the oil, costs for eliminating ecological damage).

An object of the invention is to provide an overall system which uses known components to detect icebergs and oil spills (as well as the causes of the latter) at sea in connection with a monitoring and control of ship movements and avoiding possible collisions between ships, and between ships and icebergs.

This object is achieved according to the invention by monitoring the position of ships, icebergs, and oil spills by means of a satellite based observation system equipped with dedicated synthetic aperture radar sensors (SAR). Position information acquired by the satellites is transmitted to a central facility, which continuously evaluates this information to warn of possible collisions, and to determine the cause of oil spills. The number of satellites required for such routine detection of possible oil spills and the identification of the potential causes is reduced by widening the accessible observation area on the ground. That is, an increase in the width of the observation strip permits an approximately proportional reduction in the number of satellites. Such widening can be achieved by:

the mounting of a second radar sensor so that a left-hand and a right-hand strip can be observed on the ground; or turning the satellite transversely to the flight direction in order to direct the sensor to a target area to be observed. This will be supported by modifying the pulse repetition frequency of the SAR sensor to take into account the antenna depletion angle.

By mounting a second sensor as provided in the first alternative, the number of satellites can be reduced by approximately one half while by turning the satellite according to the second alternative, the number of satellites can be reduced approximately by a factor five. If both measures are combined, a theoretical reduction factor of approximately 10 can be achieved. However, frequent turning of the satellite toward the target area to be observed requires very high on-board energy (fuel) expenditures, which reduces the orbit life of the satellite correspondingly. Furthermore, the time required to turn a satellite is several minutes. Since no observations can be carried out during this time, the resulting effective reduction factor is considerably lower than the theoretical factor (approximately 2 to 3).

In order to overcome this difficulty, the method according to the invention uses synthetic aperture radar sensors which have individual beaming devices (so-called phase array antennas), permitting an electronic pointing of the sensor transversely to the flight direction within a few milliseconds. This feature will result in an accessible and an effective observation strip. The effective strip represents the swath on ground, which can entirely be monitored by the SAR sensor at a time, also known as effective field of view of the sensor. Modifying the phases between the individual array antennas of the sensor will allow to shift the field of view of the sensor transversely to the flight direction. The resulting upper and lower border of these possible field of view directions represent the accessible swath on ground.

By means of a suitable arrangement of the individual beaming devices, the accessible observation strip on the ground can therefore be enlarged to approximately 400 to 500 km; the effective observation strip will then measure approximately 50 to 100 km. By using a right-hand and left-hand radar sensor, these values can be doubled. Thus, the accessible observation strip will measure approximately 1,000 km and is therefore larger by the factor 10 than in the case of today's ERS satellites.

The repetition rate of such a satellite will then be approximately 1.3 days or 32 hours. In order to reach the required repetition rate of, for example, 3 hours, a constellation of only 10 satellites would therefore be required. If, furthermore, only the northern sea regions starting at approximately 30 degrees latitude (such as the North Atlantic) are to be observed, (and assuming that a polar orbiting satellite is used) the required number of satellites is reduced to approximately 9 due to the convergence of the observation paths of successive orbits as they approach to pole.

The process according to the invention facilitates the following functions:

Recognition of oil spills and icebergs at sea by means of satellite-supported phased array microwave instruments with an accessible strip of approximately 1,000 km on the ground;

precise determination of the position of the ships connected to the system;

communication between the ships connected with the system and the satellites pertaining to the system, such as the communication between the satellites and a monitoring center.

The advantageous linking of these individual functions to form an overall system permits:

A substantial reduction in the number of required satellites in comparison to the technology used today;

central monitoring and reconstruction of ship movements at sea;

a central clear identification of a ship which may have caused an oil spill;

timely central establishment and targeted dissemination of warnings concerning possible collision courses (ship/ship and ship/iceberg).

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a schematic depiction of a satellite monitoring arrangement according to the invention.

DETAILED DESCRIPTION OF THE DRAWING

The overall system is illustrated in the FIGURE and consists of a system of satellites 1 which observe the sea surface with respect to oil spills 2 and icebergs 3 by means of suitable receiving sensors 4. When the receiving sensor recognizes the presence of oil spills and/or icebergs, their geographic position and size are transmitted by means of a data transmission link 5 to a system center 6. In addition, the system also includes a ship terminal 7 which is fixedly installed on the ships which are coupled with the system. By means of a conventional position location device 8, the ship terminal determines the present position of the ship and, by means of the data transmission path 9, sends this position information to the satellite, which at that point in time is situated in the visibility range of the ship terminal. The ship's position received by the satellite is stored there until it is transmitted to the system center by means of the data transmission path 5.

In the system center, the positions of all ships coupled to the system are evaluated and compared with the available position information concerning oil spills and icebergs. This comparison permits a clear identification of the causes of an oil spill, as well as a calculation for predicting possible collisions between two ships or between icebergs and ships.

If the cause of an oil spill is identified, this information can be transmitted to the responsible sea authorities and insurance companies for the purpose of legal and damage regulating measures. If possible collisions are predicted, corresponding warnings may transmitted by way of the data paths 10 and 11 to the concerned ship terminals.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for monitoring ship traffic comprising:

a plurality of earth orbiting satellites, each having at least a synthetic aperture radar microwave sensor for observing the earth's surface, said satellites being deployed in staggered orbits whereby successive such satellites observe any particular point on the earth's surface at predetermined intervals;

a data processing center for receiving and processing data transmitted from said satellites concerning position of icebergs, oil spills and ships detected by said microwave sensors;

said data processing center also having means for receiving and processing information concerning position of ships in an area observed by said satellites;

said data processing center having means for correlating said information concerning position of said ships, icebergs, and oil spills to evaluate a possibility of collisions between ships;

a possibility of collisions between ships and icebergs; and possible causes of oil spills; and said data processing center also having means for transmitting warning signals to ships concerning said possibilities of collisions.

2. Apparatus according to claim 1 further comprising means for controlling said synthetic aperture radar microwave sensors to rotate an observing axis thereof to an alignment which is transverse to an orbital path of the satellite.

3. Apparatus according to claim 2 wherein said synthetic aperture radar microwave sensors have phased array antennas.

4. Apparatus according to claim 1 further comprising position determining devices mounted on ships within an area observed by said satellites for providing position information to said data processing center.

5. Apparatus according to claim 4 wherein said position information is transmitted to said data processing center by relay from said satellites.

6. Method for monitoring ship traffic comprising the steps of:

monitoring position of ocean borne icebergs and oil spills by means of a plurality of earth orbiting satellites, each having at least a synthetic aperture radar microwave sensor for observing the earth's surface, said satellites being deployed in staggered orbits whereby successive such satellites observe any particular point on the earth's surface at predetermined intervals;

transmitting position information concerning said icebergs and oil spills from said satellites to a data processing center;

monitoring position of ships within an area observed by said satellites and transmitting position information concerning said ships to said data processing center;

correlating said position information concerning said icebergs, oil spills and ships to evaluate a possibility of collisions between ships;

a possibility of collisions between ships and icebergs; and possible cause of oil spills; and transmitting warning signals to said ships concerning possible collisions.

* * * * *